United States Patent [19]
Belz et al.

[11] Patent Number: 5,690,572
[45] Date of Patent: Nov. 25, 1997

[54] DRIVING BELT

[75] Inventors: Karl-Heinz Belz, Arnsberg; Hans-Jürgen Kelsch, Wickede, both of Germany

[73] Assignee: PLASTO Textil-GmbH, Ense-Höingen, Germany

[21] Appl. No.: 585,093

[22] Filed: Jan. 16, 1996

[30] Foreign Application Priority Data

Jan. 13, 1995 [DE] Germany ............... 195 00 897.9

[51] Int. Cl.$^6$ ............... F16G 1/04; F16G 1/28; B32B 7/00
[52] U.S. Cl. ............... 474/266; 474/202; 474/273; 428/109; 428/255; 428/292; 428/293; 428/294
[58] Field of Search ............... 474/237, 244, 474/260, 266, 268, 204, 240, 241, 242, 246, 253, 254, 255, 119, 202, 218, 273; 428/109, 110, 255, 292, 293, 294; 57/902

[56] References Cited

U.S. PATENT DOCUMENTS 2,874,583  2/1959  Platt ............... 74/231

FOREIGN PATENT DOCUMENTS

| | | |
|---|---|---|
| 1193326 | 11/1959 | France . |
| 1802032 | 12/1959 | Germany . |
| 1775247 | 6/1968 | Germany . |
| 2929904 | 7/1979 | Germany . |
| 2949897 | 12/1979 | Germany . |

OTHER PUBLICATIONS

Japanese Patent Abstracts M–1309, vol. 16/No. 438 Sep. 11, 1992.

Primary Examiner—Tamara L. Graysay
Assistant Examiner—Gary S. Hartmann
Attorney, Agent, or Firm—Collard & Roe, P.C.

[57] ABSTRACT

A driving belt formed from a textile belt with plastic catch elements injection molded onto the belt. The catch elements have equal spacing from each other in the longitudinal direction of the belt. The belt has several parallel strips, which include non-reinforced strips and reinforced strips. The plastic completely penetrates the textile belt across the non-reinforced strips.

8 Claims, 2 Drawing Sheets

DRIVING BELT

BACKGROUND OF THE INVENTION

1. Field of the Invention

The present invention relates to a driving belt. More particularly it relates to a textile belt having catch elements molded onto the belt which project outwardly from at least one side of the belt.

2. The Prior Art

Conventional plastic toothed belts are made from a flexible, relatively soft plastic material so that the belt is sufficiently flexible and has a small turning radii which is required when the moving direction of the belt is altered. Therefore, the belt part which connects the teeth to each other, has to be flexible, whereas the teeth, which engage toothed gears or the like, have to be wear resistant. Due to these different requirements, it may be detrimental to manufacture the belt and the teeth from the same material. Furthermore, conventional plastic toothed belts generally have a relatively high elasticity so that the length of the belt varies depending on the load, which is a drawback in many applications.

Japanese Patent Abstract M-1309, Vol. 16/No.438 dated Sep. 11, 1992 discloses a textile belt with catch elements molded onto the belt to provide a very strong bond between the two elements. The catch elements are made from a synthetic resin which is intended to penetrate the mesh-like surface of the woven belt. The catch elements are present on both sides of the belt. However, since the textile belt consists of a dense, comparably thick webbing, the synthetic resin cannot penetrate completely through the belt.

SUMMARY OF THE INVENTION

It is therefore an object of the present invention to overcome the drawbacks of the prior art and to provide an inexpensive, high-strength driving belt with relatively low elasticity and plastic molded teeth, which are highly wear resistent.

It is further object of the present invention to provide a driving belt with at least one non-reinforced strip, through which the synthetic resin of the teeth completely penetrates.

These and other related objects are achieved according to the invention by a driving belt extending in the longitudinal direction with a top side and an opposed bottom side. The driving belt comprises a textile belt having a non-reinforced strip extending in the longitudinal direction and a plurality of plastic catch elements injection molded onto the textile belt with equal longitudinal spacing from each other. The catch elements project outwardly from at least one side of the belt, with each catch element extending in a direction transverse to the longitudinal direction, whereby the plastic penetrates the textile belt across the non-reinforced strip. The non-reinforced strips are relatively compressible and make the belt highly flexible so that the belt can be turned on a very small radius. The catch elements are formed from a very hard plastic, which is injection molded under high pressure onto the webbing.

The textile belt includes a fabric portion with the catch elements at least partially penetrating the fabric portion. If the fabric is sufficiently tear-proof, the textile belt can have a very flat configuration. The catch elements project outwardly from both sides of the belt. The catch elements project outwardly from the top side of the belt to form a toothed belt in the longitudinal direction. The catch elements can be formed in different profiles when viewed in the longitudinal direction, for example trapezoidal, triangular or other commonly-used tooth profiles. The catch elements may also be rounded off on the top, engaging side of the belt.

During the injection molding process, the plastic material penetrates the textile belt, particularly across the non-reinforced strips. The textile belt includes a reinforced strip extending in a longitudinal direction adjacent the non-reinforced strips. Several alternating reinforced and non-reinforced strips may be arranged parallel to each other in the longitudinal direction. The non-reinforced strips comprise a single-layer, monofil fabric in a lattice structure, or a single-layer, twisted multifil fabric in a lattice structure. Each reinforced strip comprises a hollow tube made from fabric with at least two layers and reinforcing fibers embedded within the tube. Such tubular fabrics with reinforcing fiber inserts are known, for example from German Patent DE-OS 2,949,897, relating to safety belts. The fabric is made from polyamide or polyester with carbon reinforcing fibers or other reinforcing fibers with low elasticity. The reinforcing fibers are aramides or high-strength polyethylene.

The textile belt includes alternating non-reinforced strips and reinforced strips, for example, a center reinforced strip, surrounded by two non-reinforced strips which are surrounded by two additional outer reinforced strips. The plastic of the catch elements penetrates the textile belt, particularly in the non-reinforced strips. This provides a very strong bond and prevents the catch elements from tearing off the textile belt. The construction of the belt, which includes reinforcing fibers, provides a belt with a significantly lower elasticity than conventional plastic tooth belts. It is also less expensive to injection mold teeth onto a textile belt than it is to manufacture a belt in a single piece. Different types of textile belts may be made with different fabrics to impart different properties to the belt. These various belts can then be fitted with catch elements made from different plastics with different hardness and wear-resistant properties. For example, softer plastics or elastomers can be used for the catch elements if it is desirable to provide frictional engagement between the catch elements rather than a positive lock. Also by injection molding the catch elements, all different shapes may be provided.

A switching cam is also formed on the textile belt, which has a profile different from the other catch elements or teeth. In order to form an endless belt, the two free ends of the belt are placed in an overlapping relationship with each other. Catch elements are then formed on both overlapping free ends. The existing catch elements adjacent the free ends are used for exactly positioning the free ends prior to injection molding. This ensures that the existing teeth and the new teeth, formed on the overlapping ends, all maintain the exact same spacing between them.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENTS

Figure 1:
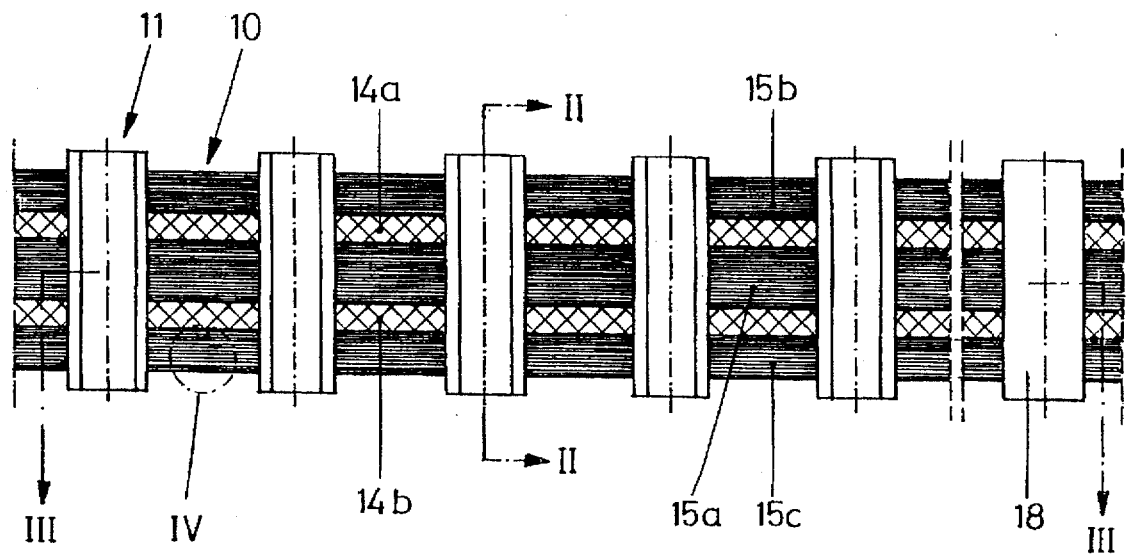
FIG. 1 is a top plan view of a driving belt according to the invention.
Figure 3:
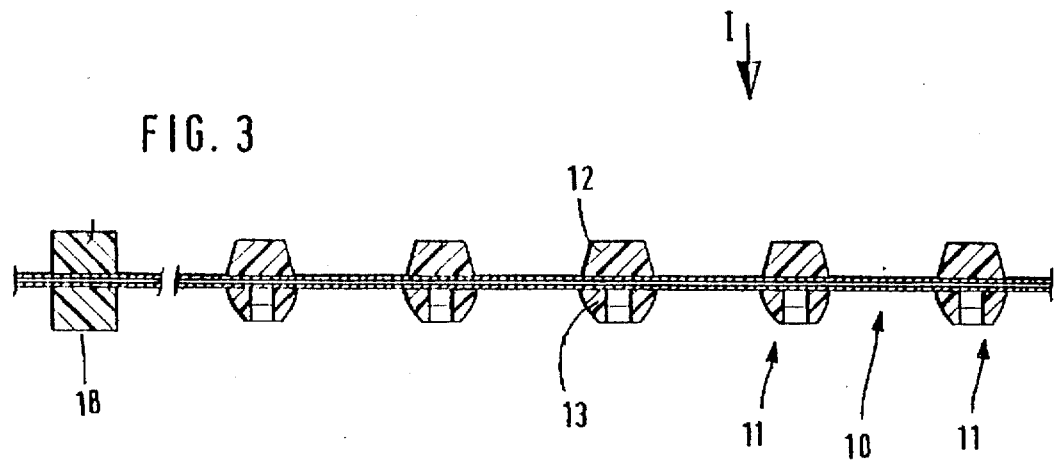
FIG. 3 is a longitudinal cross-sectional view of the driving belt taken along the line III—III from FIG. 1.

Referring now in detail to the drawings, and in particular FIG. 1, there is shown a driving belt according to the invention, which consists of a textile belt 10, having catch elements 11 formed thereon by injection molding. Catch elements 11 are regularly spaced along the longitudinal direction of belt 10, with their main dimension extending in the transverse direction of textile belt 10. FIG. 3 shows that catch elements 11 protrude upwardly and downwardly with respect to the plane of textile belt 10 with upwardly projecting teeth 12 and downwardly projecting teeth 13, respectively. The top side of driving belt 10, identified by arrow I, with upwardly projecting teeth 12 is the engagement side of belt 10. FIG. 3 shows that catch elements 11 have an approximately trapezoidal profile on the engagement side. Viewed in the longitudinal direction of textile belt 10, catch elements 11 are spaced from each other such that the intermediate spaces are slightly wider than the catch elements themselves. For example, the width of the intermediate spaces is about 1.5 times the width of catch elements 11.

Figure 2:
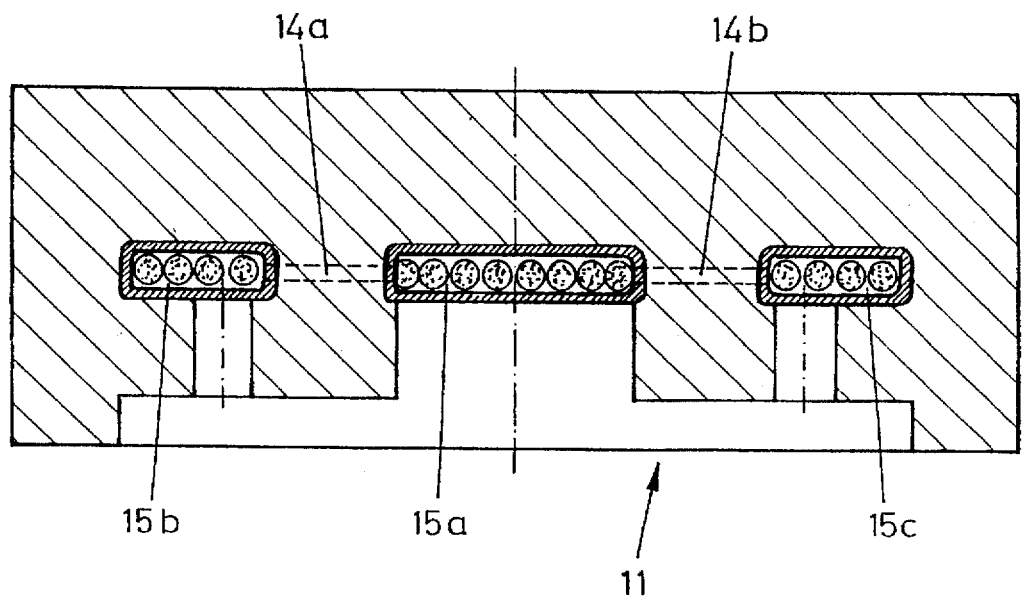
FIG. 2 is a cross-sectional view of the driving belt taken along the line II—II from FIG. 1.
Figure 4:
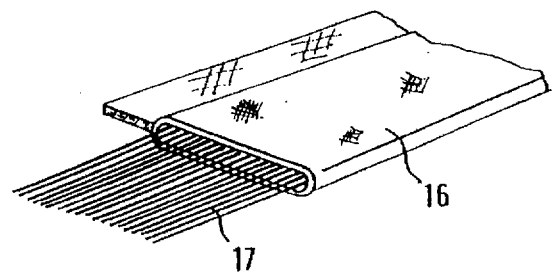
FIG. 4 is an enlarged perspective view of a reinforced section of the driving belt.

FIGS. 1 and 2 show five alternating strips in the longitudinal direction of textile belt 10, including two outer reinforced strips 15b and 15c and a center reinforced strip 15a, with non-reinforced strips 14a and 14b arranged between the reinforced strips. Strips 14a and 14b consist of a single-layer fabric or monofil, which has a porous lattice structure. Reinforced strips 15a, 15b and 15c, are made from a hollow tubular fabric which is shown enlarged in FIG. 4. These fabrics 16 are multi-layer, densely woven and highly tear-resistant fabrics which accommodate embedded reinforcing fibers 17, for example carbon fibers with relatively low elasticity. Fabric 16 is impermeable to UV-radiation and consequently protects reinforcing fibers 17 against the deteriorating effects of light.

Since strips 14a and 14b are woven into a single-layer lattice, the plastic can flow completely through the lattice as catch elements 11 are being formed by injection molding. The catch elements thus extend through textile belt 10 across strips 14a and 14b and, therefore, are solidly joined with textile belt 10. FIG. 2 shows a catch element 11 which extends completely through non-reinforced strips 14a and 14b.

FIG. 3 shows a switching cam 18, which is formed on textile belt 10 by injection molding and triggers a switching process when it reaches a defined position. The shape of the switching cam is shown in the drawing by way of example only, and may be varied in any desired way, as can the cross-sectional shape and the outline of catch elements 11.

Figure 5:
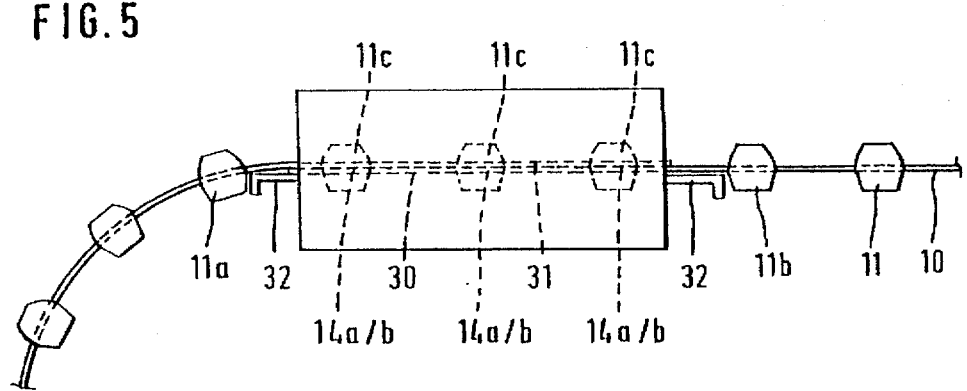
FIG. 5 is a side elevational view of an endless driving belt formed by injection molding catch elements onto the overlapping ends of the belt.

FIG. 5 shows an endless driving belt according to an alternate embodiment of the invention. Textile belt 10 has two free ends 30 and 31 which are devoid of catch elements over a certain length. The two free ends 30 and 31 are placed on top of each other so that these sections without catch elements overlap each other. Overlapping ends 30 and 31 are then jointly placed in an injection mold, with existing catch element 11a and 11b being used to exactly align ends 30 and 31. Positioning device 32 assures that the new catch elements formed on overlapping ends 30 and 31 have spacing therebetween which exactly corresponds with the spacing of the existing catch elements 11. For example, catch elements 11a and 11b abut positioning devices 32 and additional catch elements 11c are formed in between positioning devices 32. The spacing between all catch elements 11 is therefore uniform, even in the region of overlapping ends 30 and 31.

Of course, the spacing between newly injection-molded catch elements 11c is also equal to the spacing between the existing catch elements 11. A uniform endless driving belt is obtained in this way. The newly injection molded catch elements 11c penetrate each of the two overlapping ends 30 and 31 of the textile belt, across overlapping non-reinforced strips 14a and 14b. Due to such penetration, a very solid bond is achieved within the overlapping ends 30 and 31 of the textile belt, so that there is no risk of fracture within the connection zone of the endless driving belt.

Accordingly, while only several embodiments of the present invention have been shown and described, it is obvious that many changes and modifications may be made thereunto without departing from the spirit and scope of the invention.

What is claimed is:

1. A driving belt extending in a longitudinal direction with a top side and an opposed bottom side comprising:

a textile belt having a first non-reinforced strip extending in the longitudinal direction, a second non-reinforced strip extending in the longitudinal direction and a reinforced strip extending in the longitudinal direction adjacent said non-reinforced strips; and a plurality of plastic catch elements injection molded onto said textile belt with equal longitudinal spacing from each other, said plurality of catch elements projecting outwardly from at least one side of said belt with each catch element extending in a direction transverse to the longitudinal direction whereby the plastic penetrates said textile belt across said first non-reinforced strip.

2. The driving belt according to claim 1, wherein said non-reinforced strips comprise a single-layer, monofil fabric in a lattice structure.

3. The driving belt according to claim 1, wherein said non-reinforced strips comprise a single-layer, twisted multifil fabric in a lattice structure.

4. The driving belt according to claim 1, wherein said reinforced strip comprises a hollow tube made from fabric with at least two layers and reinforcing fibers embedded within said tube.

5. The driving belt according to claim 4, wherein said fabric tube is selected from the group consisting of polyamide and polyester.

6. The driving belt according to claim 4, wherein said reinforcing fibers are selected from the group consisting of carbon fibers and fibers with low elasticity.

7. The driving belt according to claim 4, wherein said reinforcing fibers are selected from the group consisting of aramides and high-strength polyethylene.

8. The driving belt according to claim 1, wherein said textile belt comprises (i) a center reinforced strip, (ii) two outer reinforced strips, and (iii) two non-reinforced strips, one of said non-reinforced strips is located between said center reinforced strip and each of said outer reinforced strips.

* * * * *